No. 867,322. PATENTED OCT. 1, 1907.
G. WALKER.
SAWING MACHINE.
APPLICATION FILED MAR. 28, 1907.
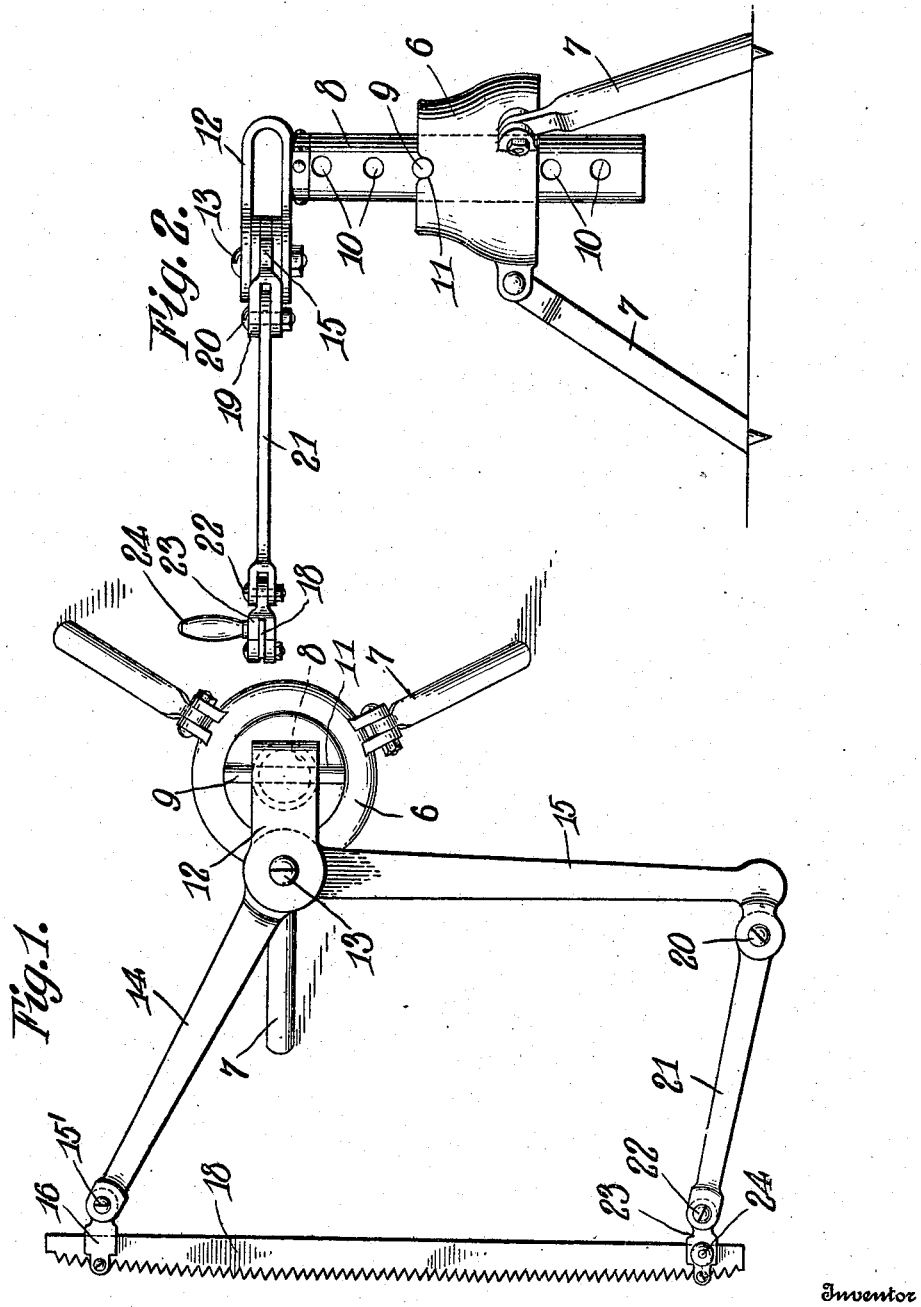

UNITED STATES PATENT OFFICE.

GEORGE WALKER, OF CHICAGO, ILLINOIS.

SAWING-MACHINE.

No. 867,322.  Specification of Letters Patent.  Patented Oct. 1, 1907.

Application filed March 28, 1907. Serial No. 365,182.

To all whom it may concern:

Be it known that I, GEORGE WALKER, a citizen of the United States, residing at Chicago, in the county of Cook and State of Illinois, have invented certain new and useful Improvements in Sawing-Machines, of which the following is a specification.

This invention relates to sawing machines, and has for its object to provide improved means for supporting a saw, particularly a cross-cut saw, in horizontal position so that it may be conveniently used for sawing down trees and the like.

The invention is illustrated in the accompanying drawings, in which

Figure 1 is a top plan view thereof. Fig. 2 is a side elevation.

Referring specifically to the drawings, 6 indicates a stand mounted upon spreading legs 7. This stand is of considerable weight and has a broad base, so that it will stand firmly and support the outwardly hanging or extending saw frame. A post 8 is mounted in the stand, and may be raised or lowered to adjust the saw to different heights. The post is held at adjustment by means of a pin 9 placed in one of the holes 10 in the post and resting in grooves 11 in the top of the stand. This supports the post and also prevents it from turning.

Mounted upon the top of the post is a horizontal bearing bracket 12, connected to which, by a pivot pin 13, are swinging arms 14 and 15 which extend at an angle to each other and swing freely with respect to each other. The arm 14 is pivotally connected by its bolt 15' with a clip 16, between which is clamped the front end of the saw 18. The arm 15 is provided with a knuckle 19 to which is pivotally connected, by a bolt 20, a swinging link 21, which is pivotally connected by a bolt 22 to a clip 23, fastened to the rear end of the saw. The clip 23 has an upwardly projecting operating handle 24.

In use, the stand is set beside the tree and the post is adjusted to bring the saw to the proper height. Then by means of the handle the saw may be pulled back and forth to cut down the tree. Pivotal connection of the arms allows the necessary swing, and, furthermore, by reason particularly of the link 21 at the rear of the saw, the line of run of the saw may be varied to follow down in the kerf. In other words, in addition to its lengthwise movement, the saw may be swung or moved laterally to follow the cut and sever a whole tree without shifting the stand. The device enables a crosscut saw or the like to be operated by one man, for the purpose intended.

The scope of the invention is not limited to the exact embodiment shown and described herein, but the construction may be modified without departing from the scope of the following claims.

I claim:

1. The combination of a vertical supporting post, horizontally swinging arms pivotally connected at one end to the top thereof, a link pivoted to the other end of one of the arms, clips pivoted to the link and the other arm respectively, and a saw held at opposite ends by the clips.

2. The combination of a support, horizontally swinging arms mounted at one end thereof, clips pivotally connected to the other end of the arms, one of the clips having a projecting handle, and a saw held at opposite ends in the clips.

In testimony whereof I affix my signature, in presence of two witnesses.

GEORGE WALKER.

Witnesses:
 NELLIE FELTSKOG,
 H. G. BATCHELOR.